(12) United States Patent
Koreeda et al.

(10) Patent No.: US 9,904,019 B2
(45) Date of Patent: Feb. 27, 2018

(54) OPTICAL-CONNECTOR-INCORPORATING PLUG

(71) Applicant: JAPAN AVIATION ELECTRONICS INDUSTRY, LIMITED, Tokyo (JP)

(72) Inventors: Yuichi Koreeda, Tokyo (JP); Hideto Shimazu, Tokyo (JP); Osamu Imaki, Tokyo (JP); Hideo Sugimoto, Tokyo (JP); Naoki Katagiyama, Tokyo (JP); Masaki Ishiguro, Tokyo (JP); Yasutaka Hiroki, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 0 days.

(21) Appl. No.: 15/512,371

(22) PCT Filed: May 29, 2015

(86) PCT No.: PCT/JP2015/065614
§ 371 (c)(1),
(2) Date: Mar. 17, 2017

(87) PCT Pub. No.: WO2016/067668
PCT Pub. Date: May 6, 2016

(65) Prior Publication Data
US 2017/0269309 A1    Sep. 21, 2017

(30) Foreign Application Priority Data
Oct. 29, 2014    (JP) .................... 2014-219914

(51) Int. Cl.
*G02B 6/38*    (2006.01)

(52) U.S. Cl.
CPC .......... *G02B 6/3823* (2013.01); *G02B 6/3821* (2013.01); *G02B 6/3825* (2013.01); *G02B 6/3879* (2013.01)

(58) Field of Classification Search
None
See application file for complete search history.

(56) References Cited

U.S. PATENT DOCUMENTS

| 2011/0123157 A1 | 5/2011 | Belsan et al. |
| 2013/0084045 A1 | 4/2013 | Aoki et al. |

(Continued)

FOREIGN PATENT DOCUMENTS

| JP | 2006-3661 | 1/2006 |
| JP | 2010-217416 | 9/2010 |

(Continued)

OTHER PUBLICATIONS

U.S. Appl. No. 15/500,254 to Yuichi Koreeda et al., filed Jan. 30, 2017.

(Continued)

*Primary Examiner* — Michael Stahl
(74) *Attorney, Agent, or Firm* — Greenblum & Bernstein, P.L.C.

(57) ABSTRACT

In an optical-connector-incorporating plug accommodating and holding an optical connector in a barrel at a front end thereof and accommodating, in the barrel, an extra length portion of an optical fiber extending from an optical cable to the optical connector, the extra length portion bends as the optical connector is moved toward a back end of the barrel when the optical connector is connected to a mating receptacle; the distance from the position where the optical connector is held to the outer wall of the barrel depends on the direction, among the directions orthogonal to the direction in which the optical connector is moved; and a guide portion guiding the bend of the extra length portion in a direction other than the direction where the distance to the outer wall of the barrel is the shortest is formed in the barrel. The optical-connector-incorporating plug can be reduced in size.

6 Claims, 11 Drawing Sheets

(56) References Cited

U.S. PATENT DOCUMENTS

2013/0272659 A1   10/2013   Hsu
2014/0029899 A1*   1/2014   Isenhour .............. G02B 6/3829
                                                                        385/79
2014/0301700 A1   10/2014   Matsubara et al.

FOREIGN PATENT DOCUMENTS

| JP | 2012-68323 | 4/2012 |
| JP | 2013-83906 | 5/2013 |
| JP | 2014-178617 | 9/2014 |
| TW | 201307929 | 2/2013 |

OTHER PUBLICATIONS

U.S. Appl. No. 15/521,417 to Naoki Katagiyama et al., filed Apr. 24, 2017.
Office Action issued in Japan Counterpart Patent Appl. No. 2014-219914, dated Aug. 18, 2015, along with an English translation thereof.
Office Action issued in Taiwan Counterpart Patent Appl. No. 104119598, dated Jul. 13, 2016, along with an English translation thereof.
International Search Report in PCT/JP2015/065614, dated Aug. 18, 2015.

\* cited by examiner

OPTICAL-CONNECTOR-INCORPORATING PLUG

TECHNICAL FIELD

The present invention relates to an optical-connector-incorporating plug having a built-in optical connector.

BACKGROUND ART

Figure 1:
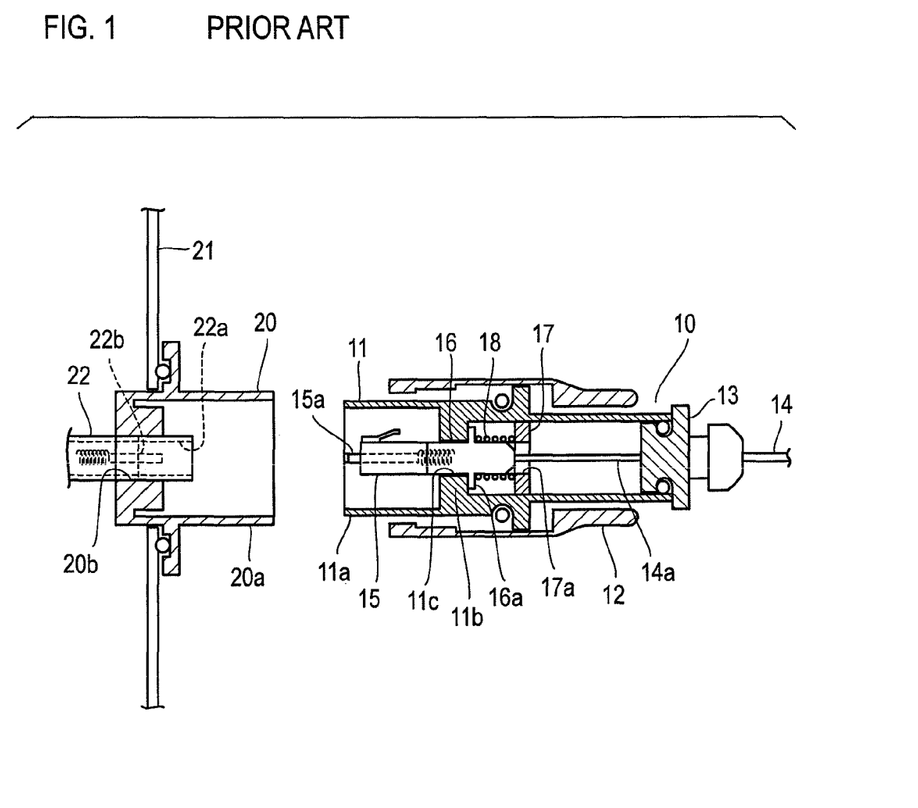
FIG. 1 is a sectional view showing a conventional example of an optical-connector-incorporating plug together with a mating adapter.

FIG. 1 shows a configuration disclosed in Patent Literature 1 as a conventional example of the optical-connector-incorporating plug of this type, and FIG. 1 also shows a mating adapter to which the optical-connector-incorporating plug (referred to as a housing in Patent Literature 1) is connected.

An optical-connector-incorporating plug 10 includes a tube portion 11, an outer tube portion 12, a coupling body 13, and a cable 14. The tube portion 11 has a joining portion 11a at a front end thereof, and in the joining portion 11a, a supporting portion 11b for supporting an optical connector 15 such that it can move in the axial direction of the tube portion is disposed. In the supporting portion 11b, a through-hole 11c is formed, and a mounting member 16 mounted to the optical connector 15 is inserted into the through-hole 11c.

The tube portion 11 has a partition wall 17 fixed at a position closer to a base end of the tube portion 11 than the supporting portion 11b, and the partition wall 17 has a through-hole 17a that lets an optical fiber 14a exit therethrough. A coil-shaped spring 18 is disposed between the partition wall 17 and a flange portion 16a of the mounting member 16, and the mounting member 16 and the optical connector 15 are biased toward a front end of the tube portion 11 in the axial direction by the force exerted by the spring 18.

An adapter 20 is fixed to a body 21 so as to cover an optical module 22 partially sticking out of the body 21. The adapter 20 has a joining portion 20a that is jointed to the tube portion 11 of the optical-connector-incorporating plug 10. The front end of the optical module 22 sticks out of a through-hole 20b formed in the adapter 20.

The optical module 22 has an insertion hole 22a into which the optical connector 15 of the optical-connector-incorporating plug 10 is inserted, and a ferrule 22b, which is connected to a ferrule 15a of the optical connector 15, is provided in the insertion hole 22a.

The optical-connector-incorporating plug 10 is joined and connected to the adapter 20 while the joining portion 20a of the adapter 20 is inserted between the outer tube portion 12 and the tube portion 11 of the optical-connector-incorporating plug 10. The optical connector 15 moves toward the base end in the axial direction, against the force exerted by the spring 18, and because of this force (resilience) exerted by the spring 18, the optical connector 15 is pressed toward the optical module 22, and consequently a good connection state can be ensured between the ferrules 15a and 22b.

PRIOR ART LITERATURE

Patent Literature 1: Japanese Patent Application Laid Open No. 2012-68323

SUMMARY OF THE INVENTION

Problems to be Solved by the Invention

As described above, when the optical-connector-incorporating plug is connected to the mating receptacle (referred to as the adapter in Patent Literature 1), the optical connector contained in the optical-connector-incorporating plug moves backward (in the direction opposite to the direction of connection) against the elastic force of the spring, and a good connection state is obtained due to the resilience of the spring. Accordingly, an extra length portion of the optical fiber needs to be provided between the optical cable and the optical connector so that the optical fiber can be bent as the optical connector moves, and this type of extra length portion is provided in the conventional optical-connector-incorporating plug shown in FIG. 1.

In order to maintain the optical properties of the optical fiber, the bend in the extra length portion is preferred to be gentle and to have as large a radius of curvature as possible. For example, if the bend causes the extra length portion of the optical fiber to hit the inner wall of a member (the tube portion 11 in FIG. 1) accommodating the extra length portion, a local bend having a small radius of curvature could appear, causing the optical properties of the optical fiber to be degraded.

Therefore, the holding space needs to be large (wide) enough so that the extra length portion of the optical fiber will not hit the member accommodating the extra length portion regardless of the bending direction, and this has been the cause of the problem that the conventional optical-connector-incorporating plug turned out to be large.

An object of the present invention is to provide an optical-connector-incorporating plug that can be made smaller than ever before.

Means to Solve the Problems

According to the present invention, in an optical-connector-incorporating plug accommodating and holding an optical connector in a barrel at a front end thereof and accommodating, in the barrel, an extra length portion of an optical fiber extending from an optical cable to the optical connector, the extra length portion bends as the optical connector is moved toward a back end of the barrel when the optical connector is connected to a mating receptacle, the distance from the position where the optical connector is held to the outer wall of the barrel depends on the direction, among the directions orthogonal to the direction in which the optical connector is moved, and a guide portion guiding the bend of the extra length portion in a direction other than the direction where the distance to the outer wall of the barrel is the shortest is formed in the barrel.

Effects of the Invention

According to the present invention, a guide portion guides the bend of an extra length portion of an optical fiber in a barrel in a direction other than a direction where the distance to the outer wall of the barrel is the shortest, allowing the space in the barrel to be used effectively, and consequently allowing the optical-connector-incorporating plug to be reduced in size.

DETAILED DESCRIPTION OF THE EMBODIMENTS

Now, embodiments of the present invention will be described.

Figure 2A:
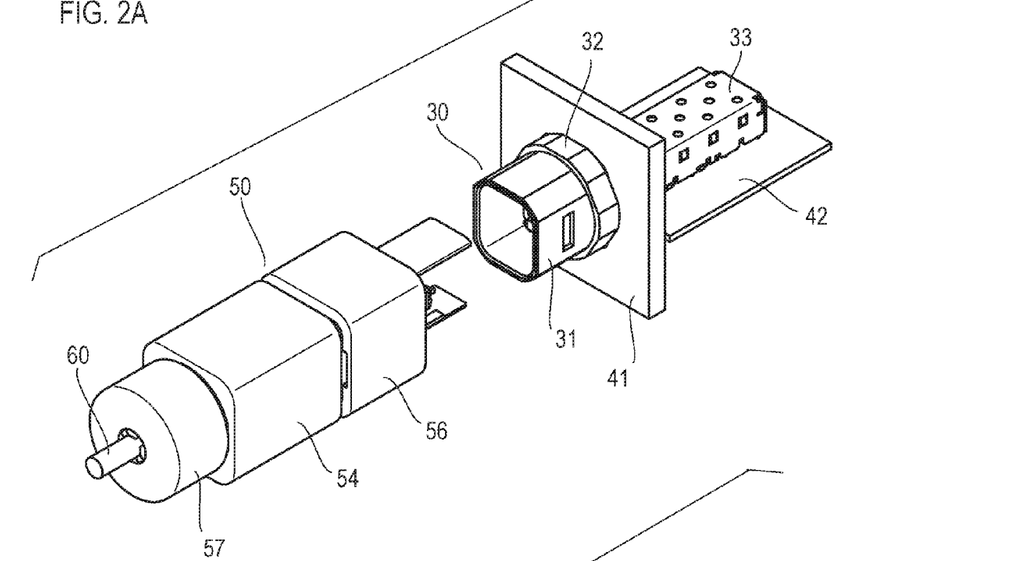
FIG. 2A is a perspective view showing the appearance of an optical-connector-incorporating plug according to an embodiment of the present invention and a mating receptacle, seen from the side of the optical-connector-incorporating plug.
Figure 2B:
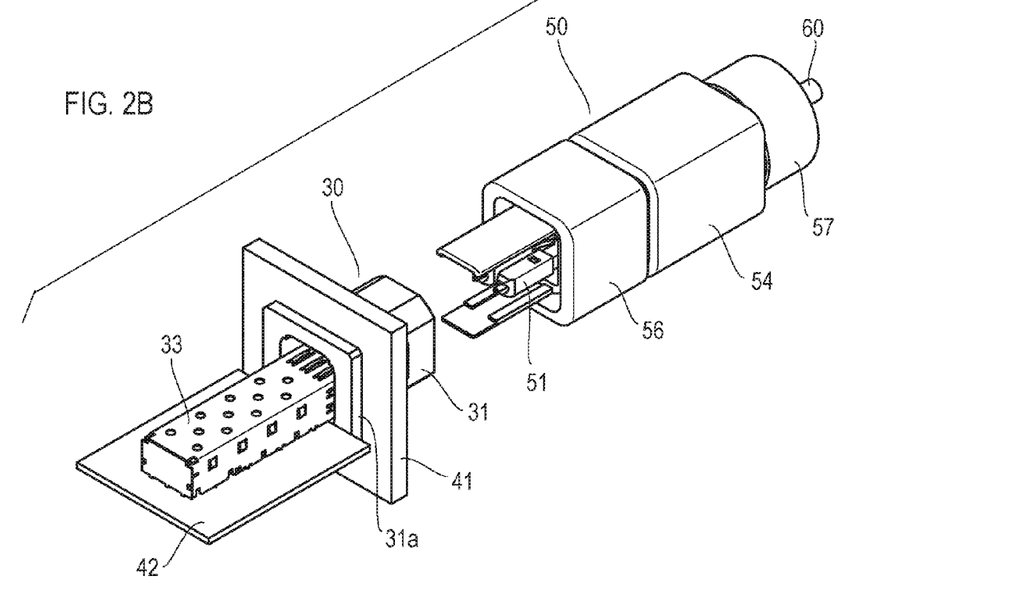
FIG. 2B is a perspective view showing the appearance of the optical-connector-incorporating plug according to the embodiment of the present invention and the mating receptacle, seen from the side of the mating receptacle.
Figure 3A:
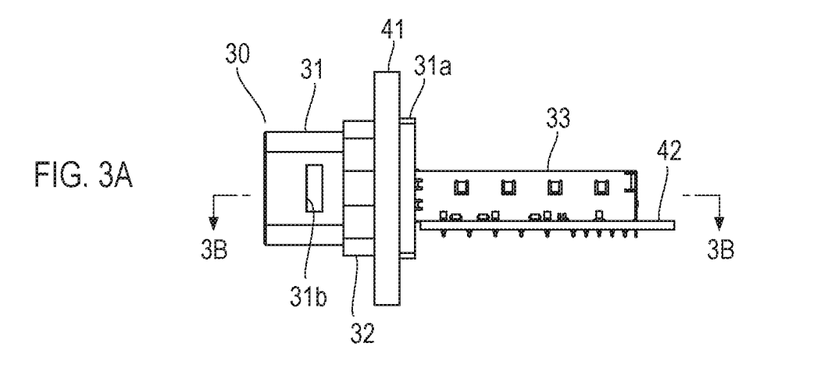
FIG. 3A is a side view of the mating receptacle shown in FIG. 2A.
Figure 3B:
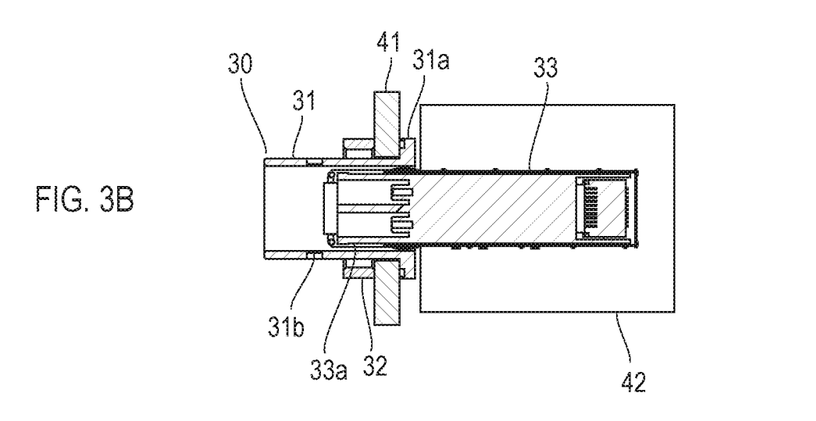
FIG. 3B is a sectional view taken along the line 3B-3B in FIG. 3A.

FIGS. 2A and 2B show the appearance of an optical-connector-incorporating plug according to an embodiment of the present invention, together with a mating receptacle, and FIGS. 3A and 3B show the configuration of the mating receptacle. FIGS. 4A to 4F show the shape of a barrel configuring the shell of the optical-connector-incorporating plug, and FIGS. 5A to 5C show details of the optical-connector-incorporating plug.

The configuration of the mating receptacle will be described first.

As shown in FIGS. 3A and 3B, a mating receptacle 30 includes a shell 31, a nut 32, and an optical module 33. A flange 31a is formed at one end of the shell 31, and the shell 31 is mounted to a panel 41 of a transmission device, for example, by holding the panel 41 between the nut 32 and the flange 31a.

The optical module 33 has an adapter 33a at one of the ends thereof and is mounted on a printed wiring board 42. The adapter 33a is inserted into and positioned in the shell 31, and the printed wiring board 42 is generally fixed to a securing member (not shown in the figures), which is not the panel 41.

As shown in FIGS. 5A to 5C, an optical-connector-incorporating plug 50 includes two optical connectors 51, a housing 52, a holder 53, a barrel 54, a coil spring 55, a coupling 56, a grand nut 57, a clamp 58, and a waterproof member 59. In FIGS. 5A to 5C, reference numeral 60 denotes an optical cable, and reference numeral 61 denotes extra length portions of optical fibers extending from the optical cable 60 and reaching the optical connectors 51. In the shown example, the optical cable 60 has two optical fibers passing through it.

In the shown example, the optical connectors 51 are LC connectors. The two optical connectors 51 mounted respectively to the ends of the two optical fibers are securely held by the housing 52. The housing 52 holding the two optical connectors 51 is mounted to the barrel 54 through the holder 53. The two optical connectors 51 accommodated at the front end of the barrel 54 are pressed by the coil spring 55 disposed in the barrel 54 in such a direction that they stick out from the front end of the barrel 54 through the housing 52. In addition to the housing 52, the holder 53 is also pressed by the coil spring 55 but is stopped by a projection (details are omitted in the figures) provided in the barrel 54 so that it will not come off.

As shown in FIGS. 4A to 4F, the barrel 54 includes a main body portion 54a having a quadrilateral outer shape, a front portion 54b having a smaller outer shape than the main body portion 54a and adjoining in front of the main body portion 54a, a square cylinder portion 54c disposed in front of the front portion 54b, positioning pieces 54d and 54e respectively formed to protrude forward from the front ends of the top face and the bottom face of the square cylinder portion 54c, a pair of connecting pieces 54f formed to protrude forward from the front portion 54b so as to be located at both sides of the square cylinder portion 54c, and a back portion 54g having a roughly cylindrical shape and adjoining the back of the main body portion 54a. The outer face of the back portion 54g is threaded, which is not shown in the figures.

Figure 4A:
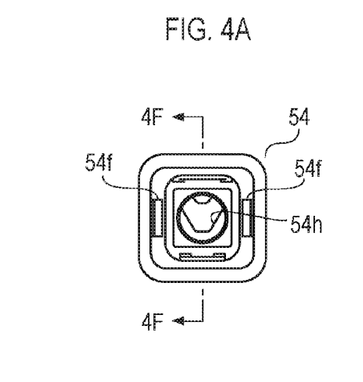
FIG. 4A is a front view of the barrel in FIG. 2B.
Figure 4B:
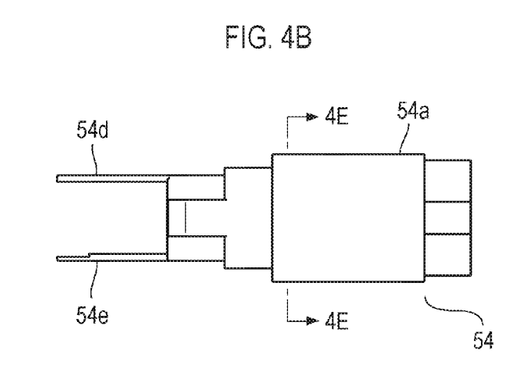
FIG. 4B is a side view of the barrel shown in FIG. 4A.
Figure 4C:
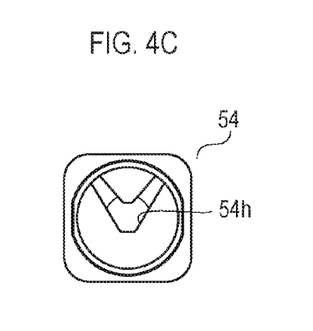
FIG. 4C is a rear view of the barrel shown in FIG. 4A.
Figure 4D:
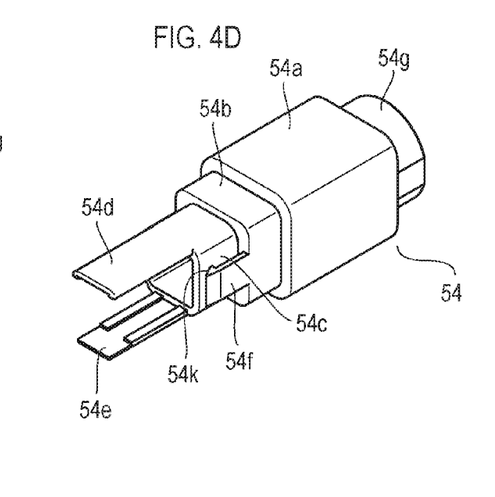
FIG. 4D is a perspective view of the barrel shown in FIG. 4A.
Figure 4E:
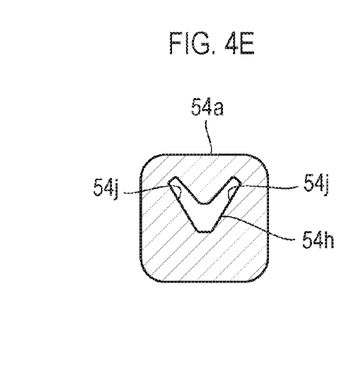
FIG. 4E is a sectional view taken along the line 4E-4E in FIG. 4B.
Figure 4F:
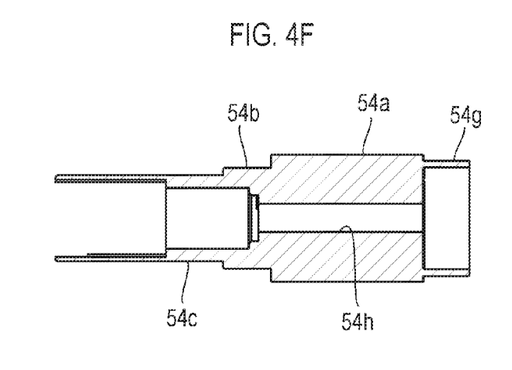
FIG. 4F is a sectional view taken along the line 4F-4F in FIG. 4A.
Figure 5A:
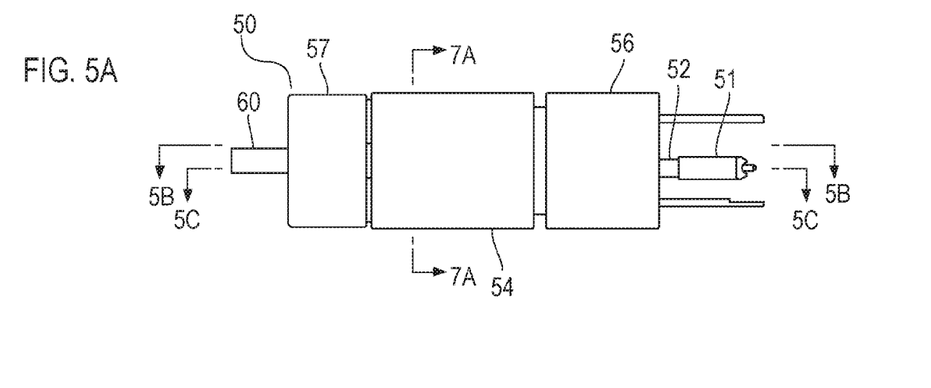
FIG. 5A is a side view of the optical-connector-incorporating plug shown in FIG. 2A.
Figure 5B:
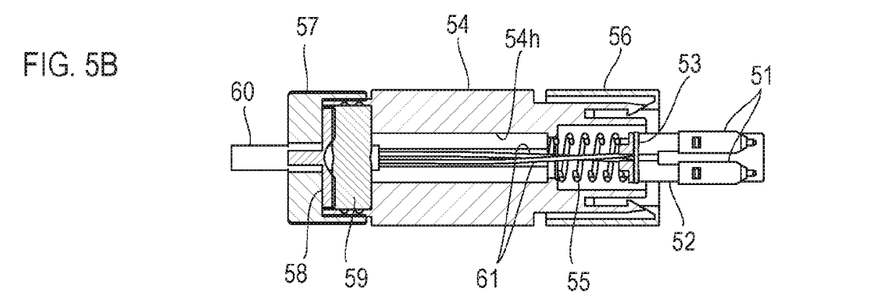
FIG. 5B is a sectional view taken along the line 5B-5B in FIG. 5A.
Figure 5C:
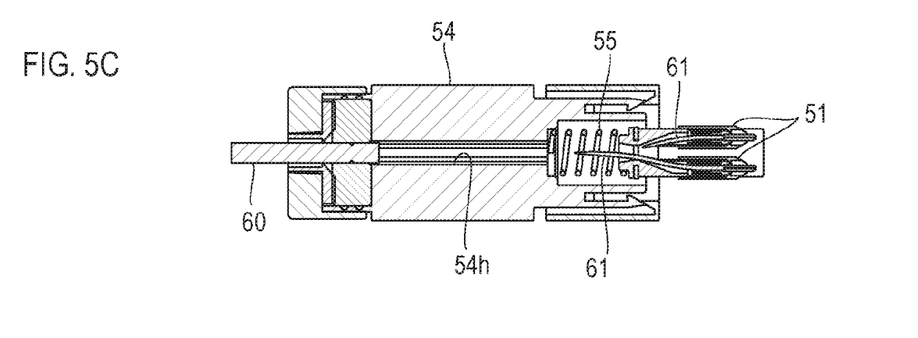
FIG. 5C is a sectional view taken along the line 5C-5C in FIG. 5A.
Figure 6A:
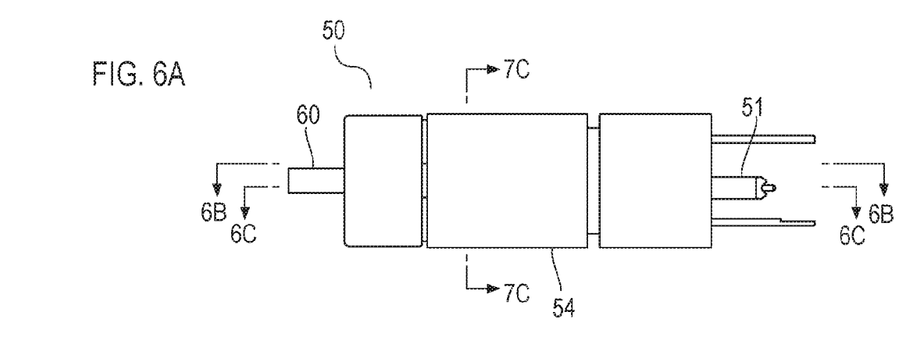
FIG. 6A is a side view showing a state in which the optical-connector-incorporating plug shown in FIG. 2A is connected with the mating receptacle.
Figure 6B:
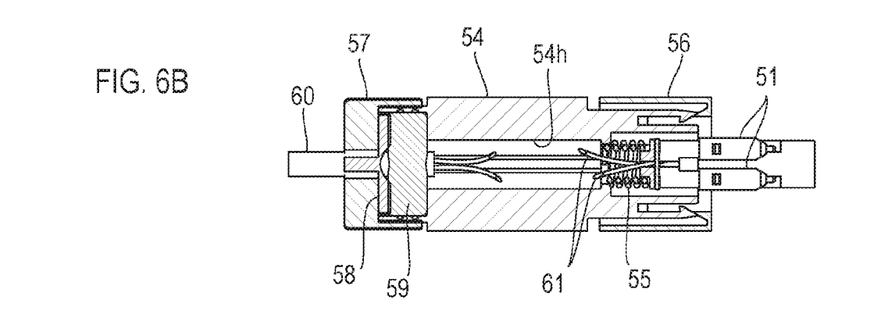
FIG. 6B is a sectional view taken along the line 6B-6B in FIG. 6A.
Figure 6C:
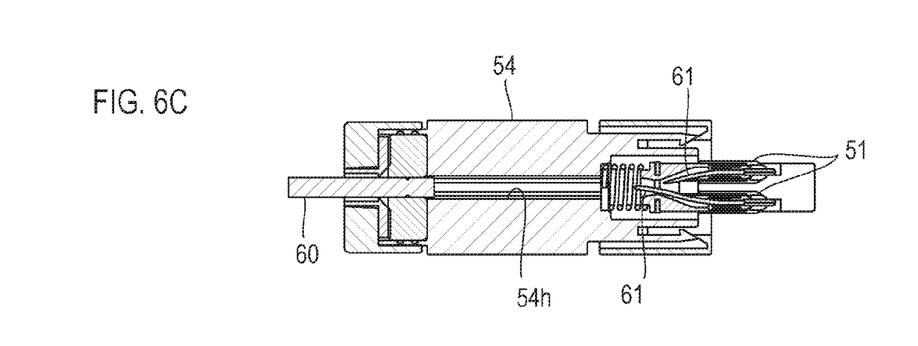
FIG. 6C is a sectional view taken along the line 6C-6C in FIG. 6A.

A guide portion 54h formed of a space having a V-shaped sectional geometry is formed to penetrate the barrel 54 in the longitudinal direction from the main body portion 54a to a part of the front portion 54b, as shown in FIG. 4E, and two grooves 54j forming the V shape are formed to extend in different diagonal directions from the center of the quadrilateral shape. The extra length portions 61 of the two optical fibers are placed in this guide portion 54h, as shown in FIG. 5B. In the shown example, the two extra length portions 61 extending to the two optical connectors 51 are disposed to cross each other.

The waterproof member 59 made of rubber and the clamp 58 are inserted in that order into the back portion 54g of the barrel 54, and then the grand nut 57 is screwed onto and mounted to the back portion 54g. Screwing the grand nut 57 causes the clamp 58 to hold the optical cable 60 tightly and securely. The waterproof member 59 is compressed to come into intimate contact with the barrel 54 and the optical cable 60, and consequently, the back end of the barrel 54 is sealed.

The coupling 56 having a square cylindrical shape is mounted to the barrel 54 to surround the front portion 54b and the pair of connecting pieces 54f of the barrel 54.

When the optical-connector-incorporating plug 50 and the receptacle 30 configured as described above are connected, the pair of positioning pieces 54d and 54e of the barrel 54 are inserted into the shell 31 and positioned there, and lugs 54k formed at the ends of the pair of connecting pieces 54f are placed at and locked in depressed portions 31b formed in the shell 31, and consequently the barrel 54 is connected and fixed to the shell 31. The square cylinder portion 54c of the barrel 54 is fitted into the shell 31.

The optical connectors 51 are inserted into the adapter 33a and connected to the optical module 33. The optical connectors 51 are pressed to move toward the back end of the barrel 54 and pressed against the adapter 33a by the resilience of the compressed coil spring 55, and consequently a good connection with the optical module 33 is obtained. As the optical connectors 51 move, the extra length portions 61 of the optical fibers are bent.

Figure 7A:
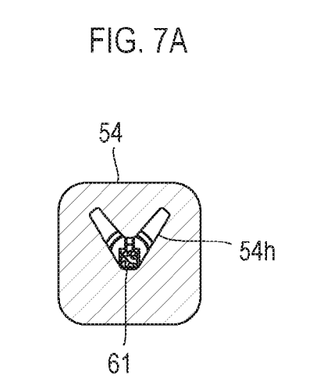
FIG. 7A is a sectional view taken along the line 7A-7A in FIG. 5A.
Figure 7B:
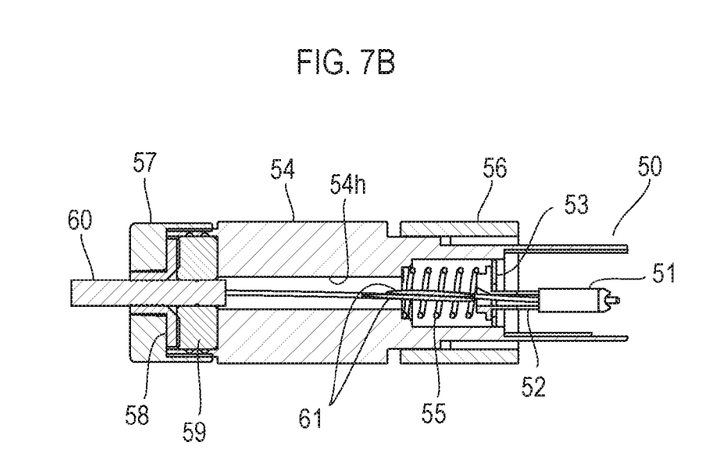
FIG. 7B is a vertical sectional view of FIG. 5A.
Figure 7C:
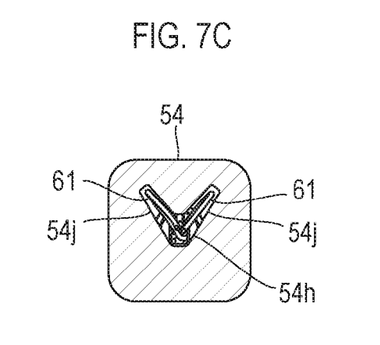
FIG. 7C is a sectional view taken along the line 7C-7C in FIG. 6A.
Figure 7D:
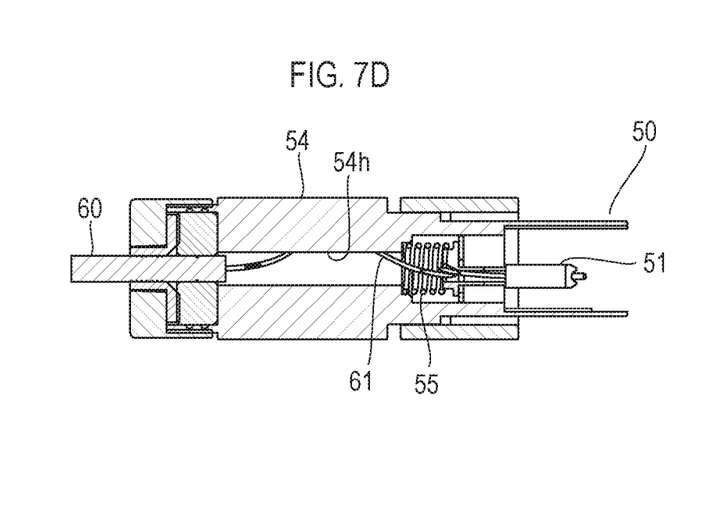
FIG. 7D is a vertical sectional view of FIG. 6A.

FIGS. 6A to 6C and FIGS. 7C and 7D show the state of the optical-connector-incorporating plug 50 when it is connected to the receptacle 30, and FIGS. 7A and 7B show the state of the optical-connector-incorporating plug 50 before it is connected, respectively corresponding to FIGS. 7C and 7D.

In the shown example, since the extra length portions 61 of the optical fibers are placed in the guide portion 54h, formed of the groove-shaped space having the V-shaped sectional geometry, the bend of the extra length portions 61 generated by the movement of the two optical connectors 51 is guided by this guide portion 54h, as shown in FIG. 7C, which means that the bending directions of the extra length portions 61 are determined by the guide portion 54h.

Therefore, when the outer shape of the barrel 54 accommodating the extra length portions 61 is quadrilateral, as in the shown example, disposing the two grooves 54j forming the V shape of the guide portion 54h in diagonal directions of the quadrilateral shape makes it possible to use the space in the barrel 54 most effectively and to correspondingly reduce the size of the barrel 54. Consequently, according to the shown example, the optical-connector-incorporating plug 50 is made smaller than ever before.

In the shown example, the extra length portions 61 of the two optical fibers are disposed to cross each other, and the two optical connectors 51 are placed at a slightly lower position than the optical cable 60, as shown in FIG. 5A. Accordingly, the extra length portions 61 of the optical fibers are slightly curved in their initial states, and as the optical connectors 51 are moved, the extra length portions 61 are bent to expand the curves. The two grooves 54j of the guide portion 54h respectively match the expanding directions of the curves and can consequently guide the bends of the extra length portions 61 naturally without any problem.

In the shown example, the barrel 54 is reduced in size by forming the guide portion 54h in the barrel 54, as described above. In addition, the barrel 54 is further reduced in size by disposing the extra length portions 61 of the two optical fibers so as to cross each other.

Figure 8:
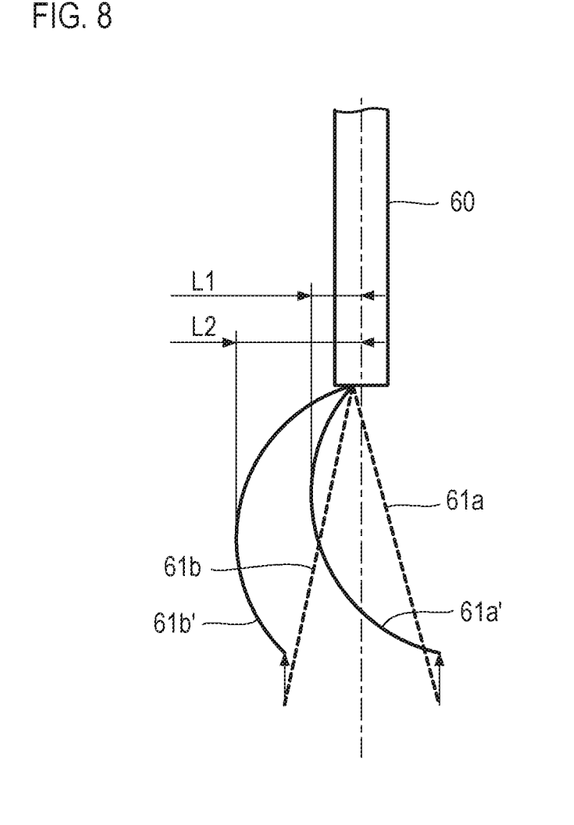
FIG. 8 is a view for illustrating an advantage of crossing wiring arrangement of the extra length portions of the optical fibers.

FIG. 8 schematically shows the advantage of this type of crossing wiring arrangement. In FIG. 8, when the left-side optical fiber of the two optical fibers in the optical cable 60 is cross-connected to the right-side optical connector 51 of the two optical connectors 51, broken line 61a represents the initial state of the corresponding extra length portion; and when the left-side optical fiber is straight-connected to the left-side optical connector 51, broken line 61b represents the initial state of the extra length portion. The curves 61a' and 61b' represent the bent states of the extra length portions 61a and 61b respectively, resulting from the movement of the optical connectors 51. In FIG. 8, the initial states of the extra length portions are represented by straight lines, and the radii of curvature are constant in the bent states.

If the distance from the central line of the optical cable 60 to the peaks of the bends of the extra length portions 61a' and 61b' are respectively expressed by $L_1$ and $L_2$, as shown in FIG. 8, $$L_1 < L_2$$

holds, meaning that this crossing wiring arrangement requires a smaller space in the barrel 54 than the straight wiring arrangement and accordingly, the barrel 54 can be reduced in size. This difference between $L_1$ and $L_2$ is caused by the pitch of the two optical connectors 51 being larger than the pitch of the two optical fibers of the optical cable 60.

FIGS. 9A to 9F show an example of a barrel having a different shape. In the shown example, a guide portion for guiding the bends of the extra length portions 61 of the optical fibers is configured by slits.

A main body portion 54a' of a barrel 54' has a square cylindrical shape, and a column portion 54m is formed to extend in the square cylinder in the longitudinal direction of the barrel 54'. A hole 54n is formed to penetrate through the center of the column portion 54m, and slits 54p are formed to connect this hole 54n to the space outside the column portion 54m (space inside the main body portion 54a') over the lengths of the column portion 54m and in the front portion 54b.

Figure 9A:
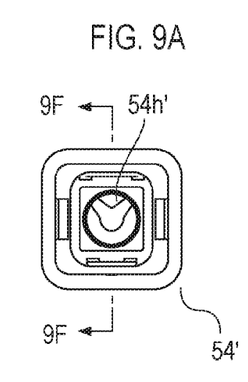
FIG. 9A is a front view showing an example of another shape of the barrel.
Figure 9B:
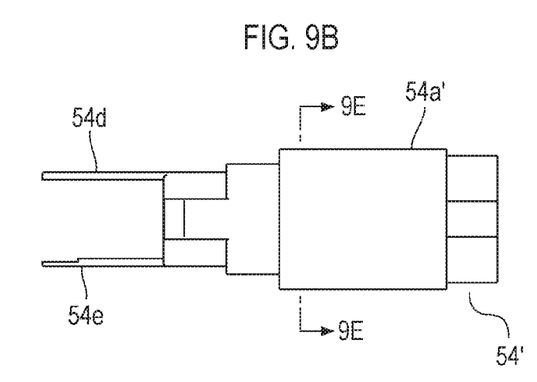
FIG. 9B is a side view of the barrel shown in FIG. 9A.
Figure 9C:
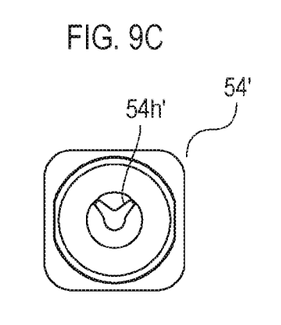
FIG. 9C is a rear view of the barrel shown in FIG. 9A.
Figure 9D:
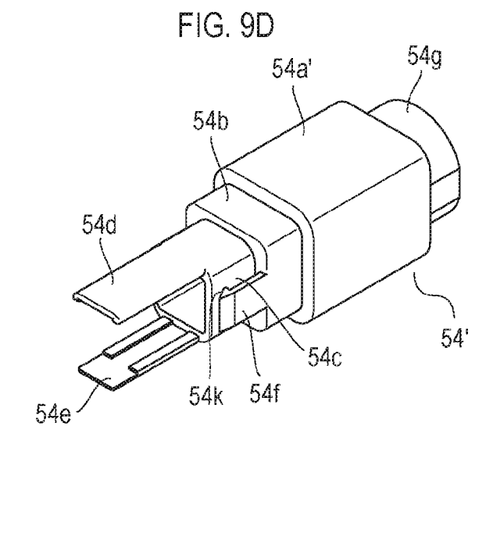
FIG. 9D is a perspective view of the barrel shown in FIG. 9A.
Figure 9E:
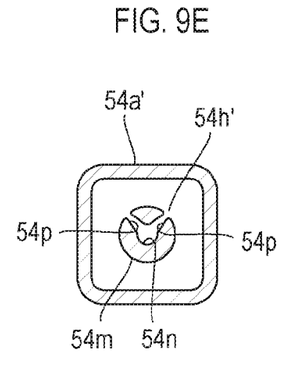
FIG. 9E is a sectional view taken along the line 9E-9E in FIG. 9B.
Figure 9F:
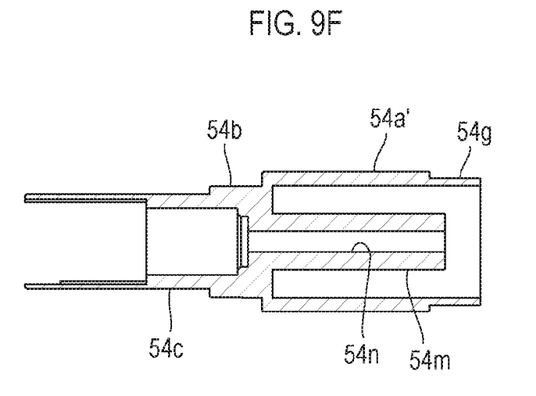
FIG. 9F is a sectional view taken along the line 9F-9F in FIG. 9A.
Figure 10A:
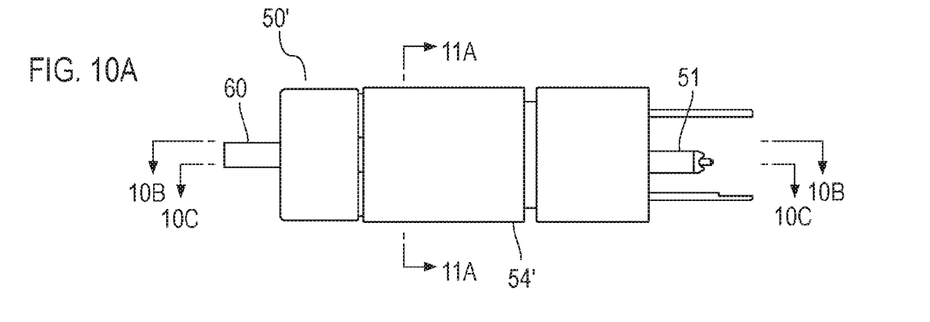
FIG. 10A is a side view showing a state in which an optical-connector-incorporating plug having the barrel shown in FIGS. 9A to 9F, according to another embodiment of the present invention is connected with a mating receptacle.
Figure 10B:
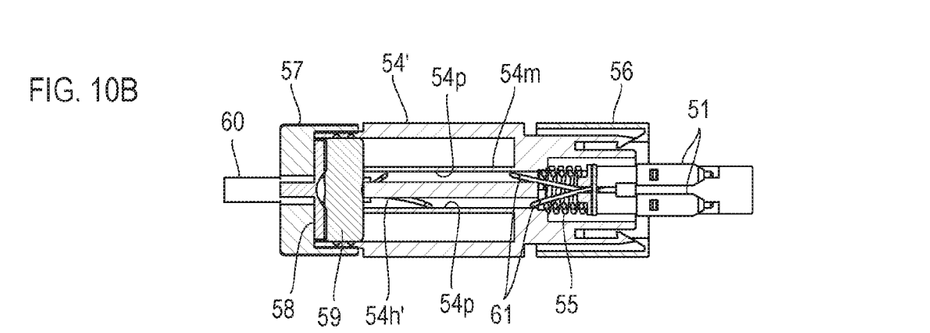
FIG. 10B is a sectional view taken along the line 10B-10B in FIG. 10A.
Figure 10C:
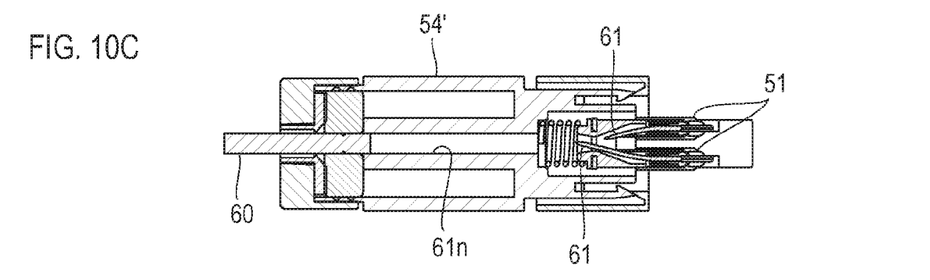
FIG. 10C is a sectional view taken along the line 10C-10C in FIG. 10A.
Figure 11A:
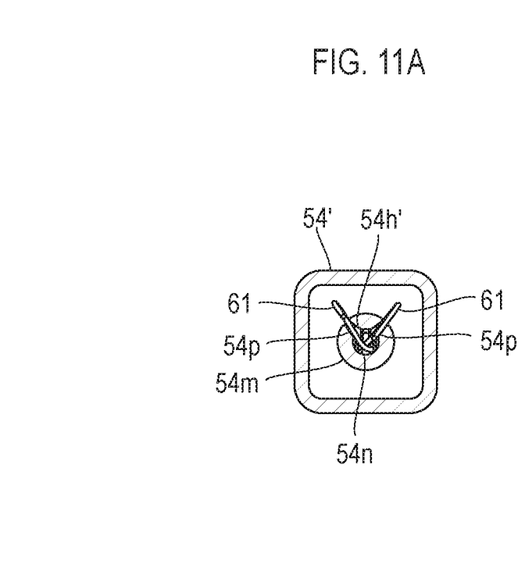
FIG. 11A is a sectional view taken along the line 11A-11A in FIG. 10A.
Figure 11B:
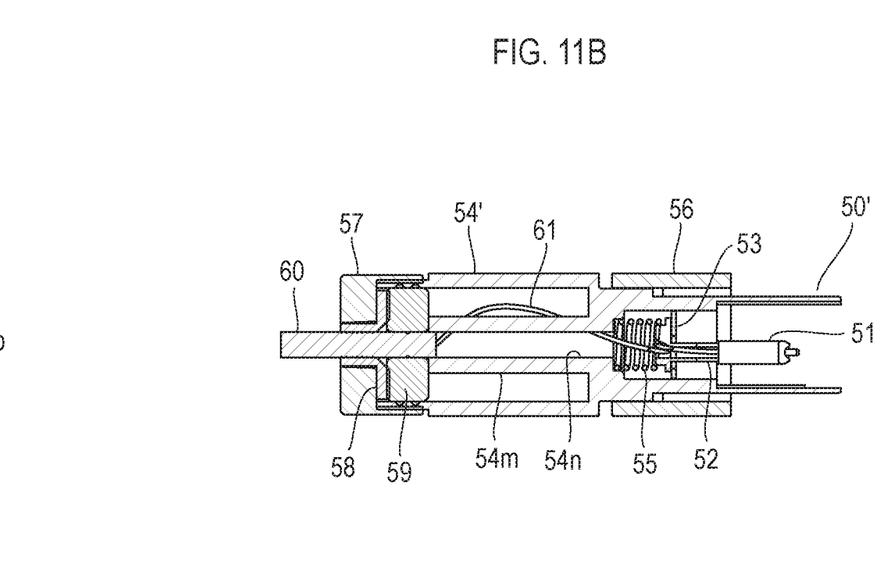
FIG. 11B is a vertical sectional view of FIG. 10A.

As shown in FIG. 9E, two slits 54p are formed, and these slits 54p are formed from the hole 54n in different diagonal directions of the main body portion 54a' having a quadrilateral outer shape. In this example, these two slits 54p configure a guide portion 54h'.

FIGS. 10A to 10C and FIGS. 11A and 11B show an optical-connector-incorporating plug 50' having the barrel 54' shown in FIGS. 9A to 9F. Like FIGS. 6A to 6C and FIGS. 7C and 7D described earlier, FIGS. 10A to 10C and FIGS. 11A and 11B show the state of the optical-connector-incorporating plug 50' when it is connected with the receptacle 30, that is, the state in which the optical connectors 51 are moved toward the back end of the barrel 54' and the extra length portions 61 of the two optical fibers are bent.

The extra length portions 61 of the two optical fibers are held in the hole 54n of the column portion 54m in the initial state. The bends of the extra length portions 61 generated by the movement of the optical connectors 51 pass through the slits 54p and protrude into the space outside the column portion 54*m*. In the shown example, the guide portion 54*h*' formed of these two slits 54*p* guide the bends of the extra length portions 61 in diagonal directions of the quadrilateral barrel 54'.

As has been described above, in this embodiments of the present invention, the guide portion 54*h* (54*h*') guides the bends of the extra length portions 61 in the directions in which the extra length portions 61 of the optical fibers can bend most, allowing the space in the barrel 54 (54') to be used most effectively, and consequently allowing the barrel 54 (54') to be reduced in size. The bends of the extra length portions 61 can be guided by the guide portion 54*h* (54*h*') because the distances from the positions where the optical connectors 51 are held to the outer wall of the barrel 54 (54') holding the extra length portions 61 depend on the direction, among the directions orthogonal to the direction in which the optical connectors 51 are moved. When the bends of the extra length portions 61 are guided at least in a direction other than the directions in which the distances to the outer wall of the barrel 54 (54') are the shortest, the space in the barrel 54 (54') can be used most effectively, consequently allowing the optical-connector-incorporating plug to be reduced in size.

In the examples described above, the two optical connectors are held in the quadrilateral barrel, and the extra length portions of the optical fibers are disposed to cross each other. However, the present invention is not confined to those embodiments and can be applied to embodiments like (1) to (3) below:

(1) A barrel having a quadrilateral outer shape (which can be a shape other than square) holds a single optical connector.
(2) A barrel having a circular outer shape holds a single optical connector in an off-center position in the barrel.
(3) A barrel (having any outer shape) holds a plurality of optical connectors.

What is claimed is:

1. An optical-connector-incorporating plug accommodating and holding an optical connector in a barrel at a front end thereof and accommodating, in the barrel, an extra length portion of an optical fiber extending from an optical cable to the optical connector, the extra length portion bending as the optical connector is moved toward a back end of the barrel when the optical connector is connected to a mating receptacle, the outer shape of the barrel being quadrilateral at the direction orthogonal to the direction in which the optical connector is moved, and a guide portion guiding the bend of the extra length portion in a diagonal direction of the quadrilateral shape being formed in the barrel.

2. The optical-connector-incorporating plug according to claim 1, wherein the guide portion is a groove-shaped accommodation space for accommodating the bend of the extra length portion.

3. The optical-connector-incorporating plug according to claim 1, wherein the guide portion is a slit that allows the extra length portion to pass therethrough.

4. The optical-connector-incorporating plug according to claim 1, wherein the barrel further accommodates and holds an optical connector identical to the optical connector in a manner identical to that for the optical connector, and the extra length portions up to the two optical connectors are disposed to cross each other.

5. The optical-connector-incorporating plug according to claim 2, wherein the barrel further accommodates and holds an optical connector identical to the optical connector in a manner identical to that for the optical connector, and the extra length portions up to the two optical connectors are disposed to cross each other.

6. The optical-connector-incorporating plug according to claim 3, wherein the barrel further accommodates and holds an optical connector identical to the optical connector in a manner identical to that for the optical connector, and the extra length portions up to the two optical connectors are disposed to cross each other.

* * * * *